(12) United States Patent
Kim et al.

(10) Patent No.: US 8,780,173 B2
(45) Date of Patent: Jul. 15, 2014

(54) METHOD AND APPARATUS FOR REDUCING FATIGUE RESULTING FROM VIEWING THREE-DIMENSIONAL IMAGE DISPLAY, AND METHOD AND APPARATUS FOR GENERATING DATA STREAM OF LOW VISUAL FATIGUE THREE-DIMENSIONAL IMAGE

(71) Applicant: Samsung Electronics Co., Ltd., Suwon-Si (KR)

(72) Inventors: Yong-tae Kim, Seoul (KR); Jae-seung Kim, Yongin-si (KR); Jae-phil Koo, Seoul (KR); Dae-sik Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/762,936

(22) Filed: Feb. 8, 2013

(65) Prior Publication Data
US 2013/0147796 A1    Jun. 13, 2013

Related U.S. Application Data

(63) Continuation of application No. 12/178,217, filed on Jul. 23, 2008, now Pat. No. 8,390,674.

(60) Provisional application No. 60/978,809, filed on Oct. 10, 2007.

(30) Foreign Application Priority Data

Nov. 27, 2007  (KR) .................. 10-2007-0121397

(51) Int. Cl.
*H04N 13/00*  (2006.01)
*H04N 13/04*  (2006.01)
*G06T 15/10*  (2011.01)
*G06T 15/20*  (2011.01)

(52) U.S. Cl.
CPC ....... *H04N 13/0003* (2013.01); *H04N 13/0018* (2013.01); *H04N 13/0404* (2013.01); *H04N 13/0484* (2013.01); *G06T 15/10* (2013.01); *G06T 15/205* (2013.01); *H04N 2013/0081* (2013.01)
USPC .............. 348/42; 348/E13.067; 348/E13.029; 348/E13.047; 345/419; 345/427; 709/231; 375/E7.076

(58) Field of Classification Search
USPC ........... 345/419, 427; 709/231; 348/E13.029, 348/E13.047, E13.067, 42; 375/E7.076
See application file for complete search history.

(56) References Cited

U.S. PATENT DOCUMENTS

| | | | |
|---|---|---|---|
| 8,111,758 B2 | 2/2012 | Yun et al. | |
| 2003/0179198 A1* | 9/2003 | Uchiyama | ..................... 345/427 |
| 2005/0190180 A1* | 9/2005 | Jin et al. | ......................... 345/419 |
| 2006/0047674 A1 | 3/2006 | Visharam et al. | |
| 2007/0156348 A1 | 7/2007 | Bae et al. | |
| 2007/0186005 A1* | 8/2007 | Setlur et al. | .................... 709/231 |
| 2007/0257902 A1 | 11/2007 | Satoh et al. | |
| 2010/0182403 A1 | 7/2010 | Chun et al. | |
| 2012/0162367 A1 | 6/2012 | Ha | |
| 2012/0224025 A1 | 9/2012 | Yu et al. | |

FOREIGN PATENT DOCUMENTS

| | | | |
|---|---|---|---|
| KR | 2003-0037140 A | 5/2003 | |
| KR | 2003-0042090 A | 5/2003 | |
| KR | 10-2006-0130450 A | 12/2006 | |
| KR | 10-2006-0130451 A | 12/2006 | |
| KR | 10-0716142 B1 | 5/2007 | |
| KR | 10-2007-0071927 A | 7/2007 | |

OTHER PUBLICATIONS

Communication dated Nov. 27, 2013, issued by the Korean Intellectual Property Office in corresponding Application No. 10-2007-0121397.

Communication dated Nov. 27, 2013, issued by the Korean Intellectual Property Office in corresponding Application No. 10-2008-0108472.
Communication dated Nov. 27, 2013, issued by the Korean Intellectual Property Office in corresponding Application No. 10-2008-0108473.
Communication dated Nov. 27, 2013, issued by the Korean Intellectual Property Office in corresponding Application No. 10-2008-0108475.
Communication dated Nov. 27, 2013, issued by the Korean Intellectual Property Office in corresponding Application No. 10-2008-0108476.
Communication dated Feb. 25, 2014 issued by the Korean Intellectual Property Office in counterpart Korean Patent Application No. 10-2008-0108476.
Communication dated Feb. 27, 2014 issued by the Korean Intellectual Property Office in counterpart Korean Patent Application No. 10-2008-0108475.
Communication dated Feb. 25, 2014 issued by the Korean Intellectual Property Office in counterpart Korean Patent Application No. 10-2008-0108473.
Communication dated Feb. 26, 2014 issued by the Korean Intellectual Property Office in counterpart Korean Patent Application No. 10-2008-0015447.

* cited by examiner

*Primary Examiner* — Kyung H Shin
(74) *Attorney, Agent, or Firm* — Sughrue Mion, PLLC

(57) ABSTRACT

Provided is a method of reducing fatigue resulting from viewing a three-dimensional (3D) image display. The method includes: obtaining low visual fatigue parameter information on a frame section including at least one frame of a received 3D image; obtaining disparity vector information on each frame of the 3D image; and determining a disparity minimum limit value and a disparity maximum limit value with respect to the 3D image.

10 Claims, 13 Drawing Sheets

| | | | |
|---|---|---|---|
| 910 — ftyp | | | file type and compatibility<br>major_brand = "ssav" |
| | ... | | |
| 920 — moov | | | container for all the metadata of timed resources |
| | ... | | |
| | trak | | container for an individual track or<br>stream indicate Main AV data or auxiliary data |
| 960 — | ... | | |
| | ... | | |
| 930 — mdat | | | media data container meta |
| 940 — meta | | | Metadata |
| | ... | | |
| 950 — | saif | | Stereoscopic safety information |

FIG. 10

| 1010 | 3DParams( ) { |
| 1020 | OptimalDisplayHorizontalSize; |
| 1025 | OptimalDisplayVerticalSize; |
| 1030 | OptimalViewingDistance; |
| 1040 | MinDisparity; |
| 1050 | MaxDisparity; |
|  | } |

FIG. 11A

Box type : 'saif'
Mandatory : No
Quantity : Zero or one
Syntax
aligne(8) class SafetyInfo extends
FullBox('saif', version = 0.0) {
...

```
unsigend int (16)    OptimalDisplayHorizontalSize;
unsigend int (16)    OptimalDisplayVerticalSize;
unsigned int (16)    OptimalViewingDistance;
int (16)      MinDisparity;
int (16)      MaxDisparity;
```
(1110)

```
Box type : 'saif'
Mandatory : No
Quantity : Zero or one
Syntax
aligne(8) class SafetyInfo extends FullBox('saifi' version = 0, 0) {
        unsigned int (32) SafetyInfoCount;
1120 — for(i=0; i < SafetyInfoCount; i++)
        {
1130 — unsigned  int (16) ES_ID;
1140 — unsigned int (16) offset;
1150 — unsigned int (16) length;
                                                        1160
        unsigend int (16)    OptimalDisplayHorizontalSize;
        unsigend int (16)    OptimalDisplayVerticalSize;
            unsigend int (16)    OptimalViewingDistance;
            int (16)             MinDisparity;
            int (16)             MaxDisparity;
        }
}
```

METHOD AND APPARATUS FOR REDUCING FATIGUE RESULTING FROM VIEWING THREE-DIMENSIONAL IMAGE DISPLAY, AND METHOD AND APPARATUS FOR GENERATING DATA STREAM OF LOW VISUAL FATIGUE THREE-DIMENSIONAL IMAGE

CROSS-REFERENCE TO RELATED PATENT APPLICATION

This application is a continuation of U.S. patent application Ser. No. 12/178,217 filed on Jul. 23, 2008 in the U.S. Patent and Trademark Office, which claims priority from U.S. Provisional Application No. 60/978,809, filed on Oct. 10, 2007 in the U.S. Patent and Trademark Office, and Korean Patent Application No. 10-2007-0121397, filed on Nov. 27, 2007, in the Korean Intellectual Property Office, and the disclosures of which are incorporated herein in their entirety by reference.

BACKGROUND OF THE INVENTION

1. Field of the Invention

Methods and apparatuses consistent with the present invention relate to reducing fatigue resulting from viewing a three-dimensional (3D) image display, and more particularly, to reducing fatigue by adjusting disparity in order to avoid a viewer's fatigue due to a disparity vector range of a 3D image, and to generating a 3D image data stream including low visual fatigue parameter information necessary for reducing the fatigue.

2. Description of the Related Art

Owing to the development of high performance display devices and to the support of a fast communication environment, commercialization of 3D image display systems is expected. However, user fatigue resulting from viewing a 3D image display is emerging as a serious problem.

An artificially realized image depth is presented through 3D effects, and thus viewers perceive fuzzy 3D effects or feel dizzy and suffer from fatigue due to the artificial image depth.

Therefore, when a user observes 3D images but is not satisfied with the appearance of the image depth of the images, the user may feel dizzy or suffer from eye fatigue. User fatigue resulting from viewing a 3D image display may manifest in various physiological forms, such as visual fatigue, dizziness, vomiting, or the like.

These forms of fatigue greatly hinder the widespread proliferation of 3D image displays.

SUMMARY OF THE INVENTION

Exemplary embodiments of the present invention provide a method and apparatus for reducing fatigue by measuring disparity limit values that cause a user to experience fatigue from viewing a 3D image display and by adjusting a disparity so that a disparity vector range of a 3D image does not exceed the disparity limit values.

Exemplary embodiments of the present invention also provide a method and apparatus for generating a 3D image data stream including low visual fatigue parameter information so as to reduce a user's fatigue resulting from viewing a 3D image display. Throughout the specification, the language "record" or "recording" means "insert" or "inserting".

According to an aspect of the present invention, there is provided a method of reducing fatigue resulting from viewing a 3D image display, the method comprising: obtaining low visual fatigue parameter information with respect to a frame section including at least one frame of a received 3D image; obtaining disparity vector information with respect to each frame of the 3D image; determining disparity limit values that are a disparity minimum limit value and a disparity maximum limit value with respect to the 3D image; and comparing the determined disparity limit values with the obtained disparity vector information and adjusting a disparity of the 3D image.

The obtaining the disparity vector information may comprise extracting the disparity vector information from a low visual fatigue parameter, wherein the disparity vector information includes a disparity vector minimum value and a disparity vector maximum value of the frame section.

The obtaining the disparity vector information may further comprise determining the disparity vector minimum value and the disparity vector maximum value of the frame section by applying a disparity estimation method to the 3D image.

The determining the disparity limit values may comprise: determining a viewing distance and a distance between both eyes of a user; determining a parallax angle between both eyes by using the viewing distance and the distance between both eyes; determining a pixel size value of the display device by using at least one of a horizontal size and a vertical size of the display device and a resolution thereof; and determining disparity minimum and maximum limit values by using at least one of the parallax angle between both eyes, the pixel size value of the display device, the distance between both eyes, and the viewing distance.

The determining the disparity limit values may further comprise extracting at least one of the viewing distance and the horizontal and vertical sizes of the display device from the low visual fatigue parameter.

The determining the disparity limit values may further comprise, if the extracted viewing distance differs from a substantial viewing distance, and the pixel size value of the display device that is determined according to the horizontal and vertical sizes of the display device differs from a pixel size value of a substantial display device, determining the parallax angle between both eyes and the disparity maximum and minimum limit values by using the pixel size value of the substantial display device.

The adjusting the disparity of the 3D image may comprise comparing a range of disparity limit values with a range of the obtained disparity vectors, wherein the range of disparity limit values is a range between the disparity maximum and minimum limit values, and the range of the disparity vectors is a range between minimum and maximum values of the obtained disparity vectors.

The adjusting the disparity of the 3D image may further comprise, if the range of the disparity vectors extends beyond the range of the disparity limit values in a predetermined direction by N pixels, parallel moving the 3D image in a direction opposite to the predetermined direction by N pixels.

The adjusting the disparity of the 3D image may further comprise, if a size of the range of the disparity vectors is greater than a size of the range of the disparity limit values, reducing the 3D image by a ratio k when the ratio k is used to reduce the size of the range of the disparity vectors smaller than the size of the range of the disparity limit values.

The low visual fatigue parameter information may be extracted from an International Standard Organization (ISO)-based media file format if the 3D image data stream is the ISO-based media file format.

The ISO-based media file format may include a moov box, an mdat box, and a meta box, wherein the low visual fatigue parameter information is extracted from at least one of a lower level box of the meta box, a lower level box of the moov box, a lower level box of a trak box that is a lower level box of the moov box, a lower level box of a trak box, and a lower level box of a meta box that is the lower level box of the trak box.

The method may further comprising: searching for reproduction information of the 3D image including size information of the display device necessary for the 3D image set by a service server providing the 3D image, from the service server; and if the size information of the display device necessary for the 3D image set by the service server is the same as a substantial 3D image display device for reproducing the 3D image, selecting the 3D image.

If the size information of the display device necessary for the 3D image set by the service server differs from the substantial 3D image display device for reproducing the 3D image, the obtaining of the low visual fatigue parameter information further comprises obtaining fatigue reduction operation information indicating whether a viewing fatigue reduction operation can be performed from the low visual fatigue parameter information, the disparity limit values are determined if it is confirmed that the viewing fatigue reduction operation can be performed according to the fatigue reduction operation information, further comprising: if it is confirmed that the viewing fatigue reduction operation cannot be performed according to the fatigue reduction operation information, the display device outputting a warning message and confirming whether to reproduce the 3D image.

According to another aspect of the present invention, there is provided an apparatus for reducing fatigue resulting from viewing a 3D image display, the apparatus comprising: a low visual fatigue parameter information obtaining unit which obtains low visual fatigue parameter information with respect to a frame section including at least one frame of a received 3D image; a disparity vector information obtaining unit which obtains disparity vector information with respect to each frame of the 3D image; a disparity limit values determining unit which determines disparity limit values that are a disparity minimum limit value and a disparity maximum limit value with respect to the 3D image; and a disparity adjusting unit which compares the determined disparity limit values with the obtained disparity vector information and adjusts a disparity of the 3D image.

The disparity vector information obtaining unit may extract the disparity vector information from a low visual fatigue parameter, wherein the disparity vector information includes a disparity vector minimum value and a disparity vector maximum value of the frame section.

The disparity vector information obtaining unit may determine the disparity vector minimum value and the disparity vector maximum value of the frame section by applying a disparity estimation method to the 3D image.

The disparity limit values determining unit may determine a viewing distance and a distance between both eyes of a user, determine a parallax angle between both eyes by using the viewing distance and the distance between both eyes, determine a pixel size value of the display device by using at least one of a horizontal size and a vertical size of the display device and a resolution thereof, and determine disparity minimum and maximum limit values by using at least one of the parallax angle between both eyes, the pixel size value of the display device, the distance between both eyes, and the viewing distance.

The disparity adjusting unit may compare a range of disparity limit values with a range of the obtained disparity vectors, if the range of the disparity vectors extends beyond the range of the disparity limit values in a predetermined direction by N pixels, may move the 3D image in a direction parallel to and opposite to the predetermined direction by the N pixels, and, if a size of the range of the disparity vectors is greater than a size of the range of the disparity limit values, may reduce the 3D image by a ratio k when the ratio k is used to reduce the size of the range of the disparity vectors smaller than the size of the range of the disparity limit values, wherein the range of disparity limit values is a range between the disparity maximum and minimum limit values, and the range of the disparity vectors is a range between minimum and maximum values of the obtained disparity vectors.

According to another aspect of the present invention, there is provided a method of generating a 3D image data stream including 3D image data, the method comprising: performing disparity estimation with respect to frames of the 3D image and determining disparity vectors; recording the 3D image data onto a payload area of the 3D image data stream; and recording a low visual fatigue parameter including at least one of the horizontal and the vertical size of a display device, a viewing distance, information on the determined disparity vectors, and fatigue reduction operation information indicating whether a view fatigue reduction operation can be performed onto a header area of the low visual fatigue 3D image data stream, as a parameter of a frame section including at least one frame of the 3D image.

The information on the determined disparity vectors may include at least one of a disparity minimum value that is a minimum value of disparity vectors of the frame section and a disparity maximum value that is a maximum value of disparity vectors of the frame section, from among the determined disparity vectors.

The recording the low visual fatigue parameter may comprise recording the low visual fatigue parameter information onto an ISO-based media file format if the 3D image data stream is the ISO-based media file format.

The ISO-based media file format may include a moov box, an mdat box, and a meta box, wherein the recording of the low visual fatigue parameter comprises recording the low visual fatigue parameter information onto at least one of a lower level box of a meta box, a lower level box of a moov box, a lower level box of a trak box that is a lower level box of the moov box, a lower level box of a trak box, and a lower level box of a meta box that is the lower level box of the trak box.

According to another aspect of the present invention, there is provided an apparatus for generating a 3D image data stream including 3D image data, the apparatus comprising: a disparity vector determining unit which performs disparity estimation with respect to frames of the 3D image and determining disparity vectors; a 3D image data recording unit which records the 3D image data onto a payload area of the 3D image data stream; and a low visual fatigue parameter recording unit which records a low visual fatigue parameter including at least one of a horizontal and vertical size of a display device, a viewing distance, information on the determined disparity vectors, and fatigue reduction operation information indicating whether a view fatigue reduction operation can be performed onto a header area of the low visual fatigue 3D image data stream, as a parameter of a frame section including at least one frame of the 3D image.

The information on the determined disparity vectors may include at least one of a disparity minimum value that is a minimum value of disparity vectors of the frame section and a disparity maximum value that is a maximum value of disparity vectors of the frame section from among the determined disparity vectors.

According to another aspect of the present invention, there is provided a computer readable recording medium having recorded thereon a program for executing the method of reducing fatigue resulting from viewing a three-dimensional (3D) image display.

According to another exemplary embodiment of the present invention, there is provided a computer readable recording medium having recorded thereon a program for executing the method of generating a 3D image data stream including 3D image data.

BRIEF DESCRIPTION OF THE DRAWINGS

The above and other aspects of the present invention will become more apparent by the following detailed description of exemplary embodiments thereof with reference to the attached drawings in which:

FIG. 10 illustrates a structure of a 3D low visual fatigue parameter according to an exemplary embodiment of the present invention;

FIG. 11A is a diagram for explaining a method of presenting a 3D low visual fatigue parameter in an ISO-based media file format according to an exemplary embodiment of the present invention;

FIG. 11B is a diagram for explaining a method of presenting a 3D low visual fatigue parameter in an ISO-based media file format according to another exemplary embodiment of the present invention;

DETAILED DESCRIPTION OF EXEMPLARY EMBODIMENTS OF THE INVENTION

Hereinafter, the present invention will be described more fully with reference to the accompanying drawings, in which exemplary embodiments of the invention are shown.

Figure 1:
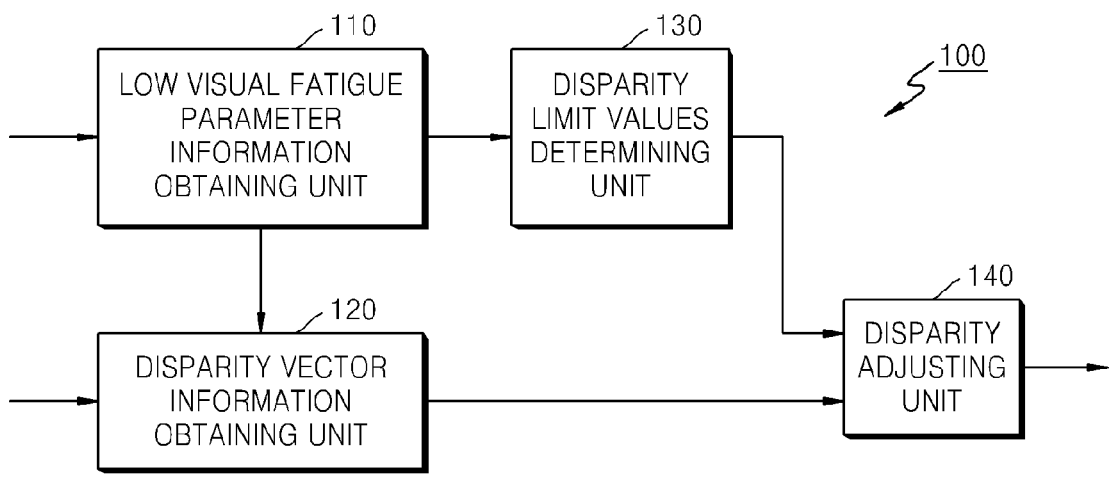
FIG. 1 is a block diagram of an apparatus for reducing fatigue resulting from viewing a 3D image display according to an exemplary embodiment of the present invention.

FIG. 1 is a block diagram of an apparatus 100 for reducing fatigue resulting from viewing a 3D image display according to an exemplary embodiment of the present invention. Referring to FIG. 1, the apparatus 100 for reducing fatigue resulting from viewing the 3D image display comprises a low visual fatigue parameter information obtaining unit 110, a disparity vector information obtaining unit 120, a disparity limit values determining unit 130, and a disparity adjusting unit 140.

The low visual fatigue parameter information obtaining unit 110 obtains low visual fatigue parameter information with respect to a frame section including one or more frames of a received 3D image. The unit 110 outputs the low visual fatigue parameter information to the disparity vector information obtaining unit 120 and the disparity limit values determining unit 130.

The low visual fatigue parameter is a parameter used for or supporting prediction of a degree of fatigue that occurs when a user watches 3D image content. In the present embodiment, examples of low visual fatigue parameters are the size of a display screen, a viewing distance, maximum and minimum disparity values of content, and the like.

In the present exemplary embodiment, the low visual fatigue parameter information can be determined per frame section including one or more frames. Therefore, when a frame section includes all frames, although the same low visual fatigue parameter information may be applied to all frames, different types of low visual fatigue parameter information may be applied to some frames.

The disparity vector information obtaining unit 120 obtains disparity vector information from the low visual fatigue parameter information received from the low visual fatigue parameter information obtaining unit 110 and from the received 3D image, and outputs the disparity vector information to the disparity adjusting unit 140.

The disparity vector information obtaining unit 120 extracts the disparity vector information from a low visual fatigue parameter. The disparity vector information includes maximum and minimum disparity vector values of a frame section. When the same low visual fatigue parameter is applied to all frame sections, the disparity vector information may include average values of minimum and maximum values of disparity vectors of all frames.

Alternatively, the disparity vector information obtaining unit 120 may apply a disparity estimation method to the received 3D image and determine minimum and maximum disparity values of a frame section. When the same low visual fatigue parameter is applied to all frame sections, the disparity vector information may include average values of minimum and maximum values of disparity vectors of all frames.

The disparity limit values determining unit 130 receives the low visual fatigue parameter information from the low visual fatigue parameter information obtaining unit 110, determines disparity limit values that are minimum and maximum disparity limit values of the received 3D image, and outputs the disparity limit values to the disparity adjusting unit 140.

The disparity limit values determining unit 130 determines a viewing distance and a distance between both eyes of a user and determines a viewing angle of both eyes by using the distances between the user and the display screen and between both eyes. The disparity limit values determining unit 130 determines pixel size values of a display device by using at least one of the horizontal and vertical size of the display device and the resolution thereof. Alternatively, the disparity limit values determining unit 130 determines the minimum and maximum display limit values by using at least one of the viewing angle of both eyes, the distances between the user and the display device and between both eyes, and the pixel size values of the display device. A method of determining the display limit values corresponding to the minimum and maximum display limit values will be described with reference to FIG. 3.

The disparity limit values determining unit 130 detects at least one of the viewing distance and the horizontal and vertical size of the display screen from the low visual fatigue parameter information.

Alternatively, when the detected viewing distance differs from a substantial viewing distance, and the pixel size values of the display device determined according to the detected horizontal and vertical size of the display device differ from substantial pixel size values of the display device, the disparity limit values determining unit 130 may determine the viewing angle of both eyes and the minimum and maximum display limit values by using the substantial pixel size values of the display device.

The disparity adjusting unit 140 receives the disparity limit values from the disparity limit values determining unit 130, compares the disparity limit values determining unit 130 with the disparity vector information, and adjusts a disparity of the received 3D image.

The disparity adjusting unit 140 compares a disparity limit value range with a disparity vector average value range. The disparity limit value range is a range between a minimum disparity limit value and a maximum disparity limit. The disparity vector average value range is a range between an average value of minimum values and an average value of maximum values of obtained disparity vectors.

As a result of comparing the disparity limit value range with the disparity vector average value range, if the disparity vector average value range exceeds the disparity limit value range by N pixels in a predetermined direction, the disparity adjusting unit 140 moves the received 3D image by the N pixels in a direction parallel to but opposite to the predetermined direction If the disparity vector average value range is greater than the disparity limit value range, the disparity adjusting unit 140 reduces the received 3D image by a ratio k when the ratio k is used to reduce the disparity vector average value range so as to be smaller than the disparity limit value range.

The apparatus 100 for reducing fatigue resulting from viewing the 3D image display extracts the low visual fatigue parameter from an ISO-based media file format when the 3D image data stream is in the ISO-based media file format.

Alternatively, when the 3D image data stream is in the ISO-based media file format, examples of the ISO-based media file format include a moov box, a mdat box, and a meta box. The low visual fatigue parameter information including the disparity vector information for adjusting the disparity may be extracted from at least one of a lower level box of the meta box, a lower level box of the moov box, a lower level box of a trak box that is a lower level box of the moov box, a lower level box of a trak box, and a lower level box of a meta box that is the lower level box of the trak box.

Figure 2:
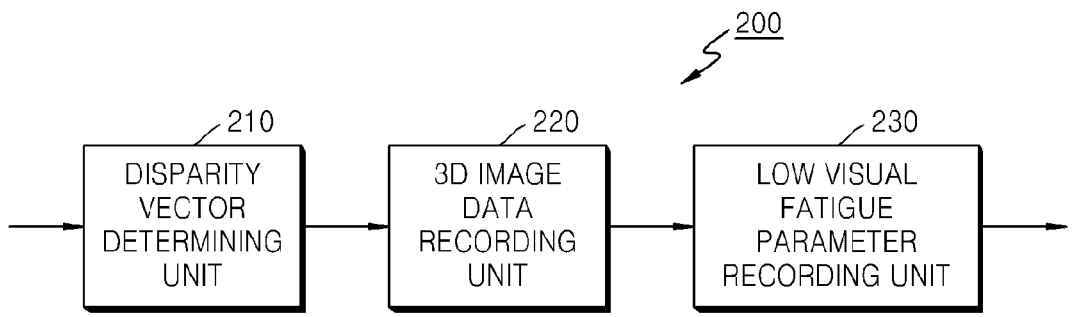
FIG. 2 is a block diagram of an apparatus for generating a low visual fatigue 3D image data stream according to an exemplary embodiment of the present invention.

FIG. 2 is a block diagram of an apparatus 200 for generating a low visual fatigue 3D image data stream according to an exemplary embodiment of the present invention. Referring to FIG. 2, the apparatus 200 for generating a low visual fatigue 3D image data stream comprises a disparity vector determining unit 210, a 3D image data recording unit 220, and a low visual fatigue parameter recording unit 230.

The disparity vector determining unit 210 applies a disparity estimation method to a 3D image to determine a disparity vector. The disparity estimation method of this embodiment is the conventional disparity estimation method and thus its description will not be repeated here.

The 3D image data recording unit 220 records 3D image data onto a payload area of the 3D image data stream.

The low visual fatigue parameter recording unit 230 records a low visual fatigue parameter including at least one of the horizontal and vertical size of a display device, a viewing distance, and information on the determined disparity vector onto a header area of the 3D image data stream as a parameter of a frame section including one or more frames of a 3D image.

When the 3D image data stream is in an ISO-based media file format, the low visual fatigue parameter recording unit 230 may record the low visual fatigue parameter information onto the ISO-based media file format stream.

Alternatively, when the 3D image data stream is in the ISO-based media file format and includes a moov box, a mdat box, and a meta box, the low visual fatigue parameter recording unit 230 may record multi-view camera parameter information onto at least one of a lower level box of the meta box, a lower level box of the moov box, a lower level box of a trak box that is a lower level box of the moov box, a lower level box of a trak box, and a lower level box of the meta box that is the lower level box of the trak box.

Figure 3:
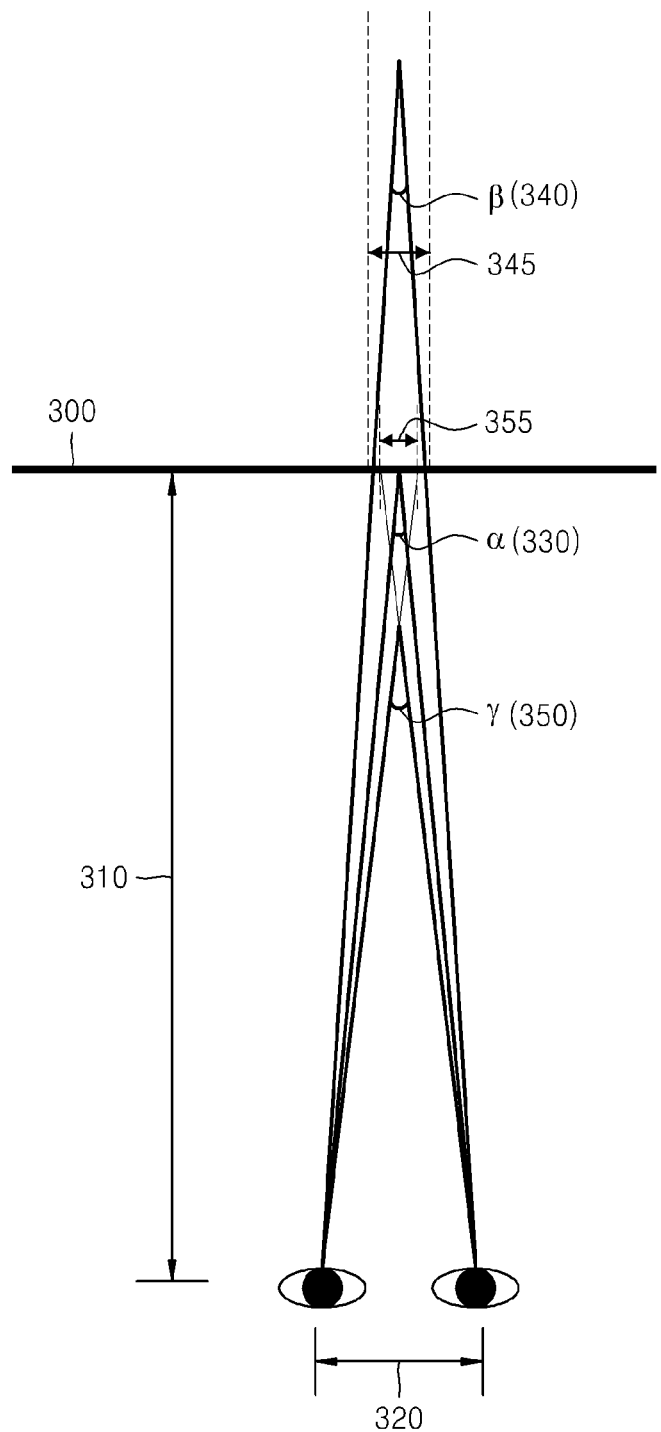
FIG. 3 is a diagram for explaining a method of determining minimum and maximum display limit values according to an exemplary embodiment of the present invention.

FIG. 3 is a diagram for explaining a method of determining the minimum and maximum display limit values according to an exemplary embodiment of the present invention. Referring to FIG. 3, a method of operating the disparity limit value determining unit 130 will now be described.

Since fatigue may result from viewing 3D images, the safety specification of the Japanese 3D consortium has suggested a parallax angle range of a screen display within ±1°. The parallax angle is a difference between an adjustment angle 330 α and convergence angles 340 β and 350 γ. Hence, the parallax angle range of the present embodiment is within ±1°.

Since a disparity by the parallax angle is presented on a display screen 300 in a pixel unit, a disparity limit value range is determined by the pixel size of the display screen 300, and the pixel size is determined according to the size and resolution of the display screen 300. A distance 310 between a user and the display screen 300 and a distance 320 between both eyes of the user are needed to know the parallax angle. That is, trigonometry using the distance 310 between the user and the display screen 300 and the distance 320 between both eyes of the user can be used to calculate the adjustment angle 330 α. Differences between the convergence angles 340 β and 350 γ and the adjustment angle 330 α are set to −1° and +1° in order to make the parallax angle within ±1°.

Hereinafter a process of calculating a disparity limit value will now be described.

When the size and resolution of the display screen 300 are 2.5 inches and 320×240, respectively, the pixel size of the display screen 300 is 0.159 mm. Generally, the distance 310 between the user and the display screen 300 and the distance 320 between both eyes are set to 300 mm and 65 mm, respectively. The adjustment angle 330 α is 12.37° according to the trigonometry using the distance 310 between the user and the display screen 300 and the distance 320 between both eyes of the user. Therefore, the convergence angles 340 β and 350 γ are 11.37° and 13.37°, respectively.

According to the trigonometry using the distance 320 between both eyes, disparities 345 and 355 caused by the convergence angles 340 β and 350 γ are 5.73 mm and 5.32 mm, respectively. The limit values of the disparities 345 and 355 are determined as +36 pixels and −33 pixels.

Alternatively, when the size of the display screen 300 is 3.5 inches, since the pixel size of the display screen 300 is 0.219 mm, the limit values of the disparities 345 and 355 are determined as +26 pixels and −24 pixels on a display screen having the size of 2.5 inches.

A 3D content display based on the disparity limit values stated above confirms that a change in the size of a 3D display screen can change the disparity limit values. A large disparity of 3D content displayed on a small 3D display screen causes only a little fatigue, whereas the same content displayed on a large 3D display screen may cause a great deal of fatigue.

Therefore, a content creator provides display information optimized to 3D content when creating the 3D content, so that the user can search for the 3D content from a service server and select a 3D image causing less fatigue.

When the size optimized according to the 3D content that the user is to produce and the size of a terminal differ from each other, if there is a device or a recording medium for performing a fatigue reducing method, the fatigue reducing method is performed, and, if not, a warning message is displayed to ask the user whether to reproduce the 3D content.

Figure 4:
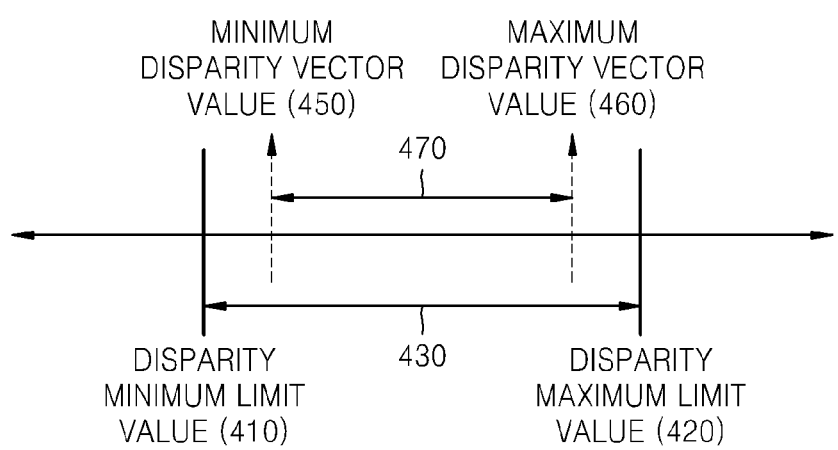
FIG. 4 illustrates an ideal distribution of disparity vectors.

FIG. 4 illustrates an ideal distribution of disparity vectors. Referring to FIG. 4, a maximum disparity vector value 450 and a minimum disparity vector value 460 of a 3D image are within the range between a disparity minimum limit value 410 and a disparity maximum limit value 420, and it is ideal that a range 470 of disparity vectors does not exceed a range 430 of the disparity limit values. In this case, a post-process is not needed to adjust disparity of the 3D image.

In the present embodiment, disparity vector information is extracted from header information of a received 3D image data stream in order to calculate disparity vectors. Alternatively, a disparity estimation method may be applied to the received 3D image to directly determine disparity vectors.

Figure 5A:
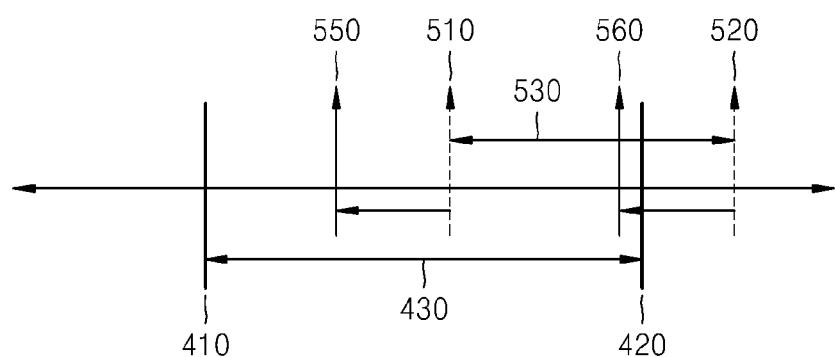
FIG. 5A illustrates an exemplary distribution of disparity vectors in a positive direction.

FIG. 5A illustrates a distribution of disparity vectors in a positive direction. Referring to FIG. 5A, a range 530 of disparity vectors does not exceed the range 430 of the disparity limit values, a minimum value 510 of disparity vectors is within the disparity minimum limit value 410 and the disparity maximum limit value 420, and a maximum value 520 of disparity vectors extends in the positive direction by N pixels beyond the disparity minimum limit value 410 and the disparity maximum limit value 420.

The disparity adjusting unit 140 can move the range 530 of disparity vectors in a negative direction by the N pixels so as to be adjusted to a minimum value 550 and a maximum value 560 of disparity vectors, so that the minimum value 510 and the maximum value 520 of disparity vectors are within the disparity minimum limit value 410 and the disparity maximum limit value 420.

Figure 5B:
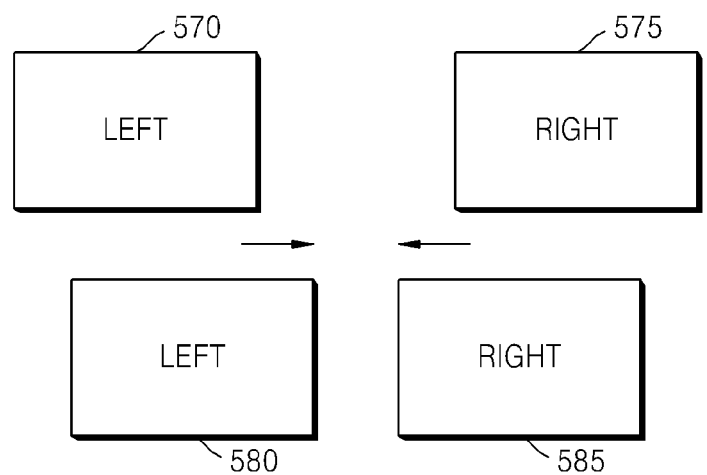
FIG. 5B is a diagram for explaining an exemplary disparity adjusting method when disparity vectors are distributed in a positive direction.

FIG. 5B is a diagram for explaining an exemplary disparity adjusting method when disparity vectors are distributed in a positive direction. Referring to FIG. 5B, since disparity vectors of a left viewpoint image 570 and a right viewpoint image 575 of a 3D image are distributed in a positive direction by N pixels, the disparity adjusting unit 140 moves both the left viewpoint image 570 and the right viewpoint image 575 in a negative direction by the N pixels to adjust disparity of the 3D image. Therefore, the disparity adjusting unit 140 can move the left viewpoint image 570 and the right viewpoint image 575 in the negative direction and generate a disparity adjusted left viewpoint image 580 and a disparity adjusted right viewpoint image 585, respectively.

Figure 6A:
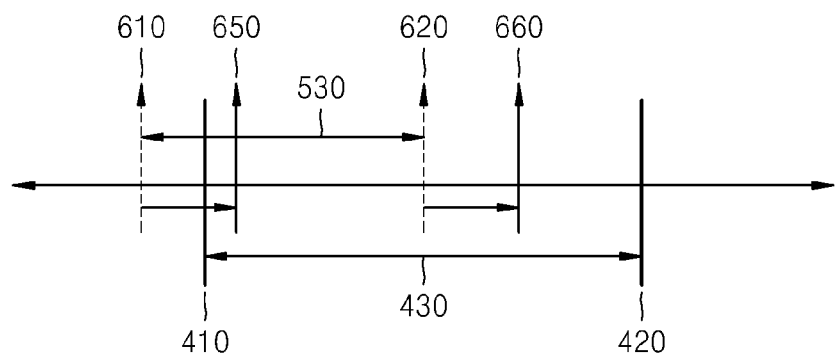
FIG. 6A illustrates an exemplary distribution of disparity vectors in a negative direction.

FIG. 6A illustrates a distribution of disparity vectors in a negative direction. Referring to FIG. 6A, a range 630 of disparity vectors does not exceed the range 430 of the disparity limit values, a minimum value 610 of disparity vectors is within the disparity minimum limit value 410 and the disparity maximum limit value 420, and a maximum value 620 of disparity vectors extends in the negative direction by N pixels beyond the disparity minimum limit value 410 and the disparity maximum limit value 420.

According to another exemplary embodiment, the range 630 of disparity vectors is moved in a positive direction by the N pixels so as to be adjusted to a minimum value 650 and a maximum value 660 of disparity vectors, so that the minimum value 610 and the maximum value 620 of disparity vectors are within the disparity minimum limit value 410 and the disparity maximum limit value 420.

Figure 6B:
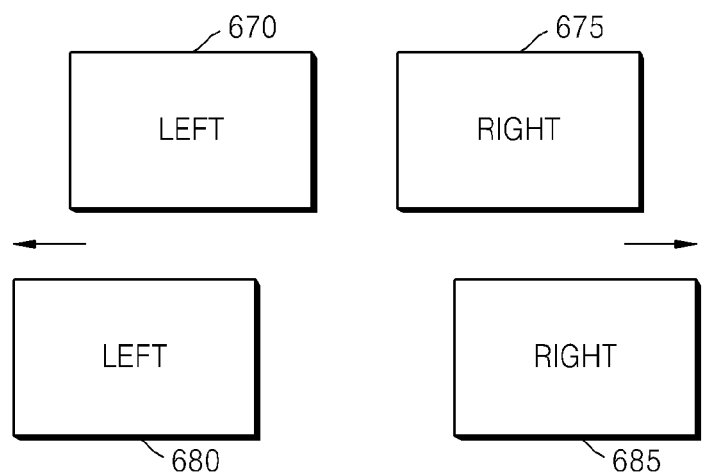
FIG. 6B is a diagram for explaining an exemplary disparity adjusting method when disparity vectors are distributed in a negative direction.

FIG. 6B is a diagram for explaining an exemplary disparity adjusting method when disparity vectors are distributed in a negative direction. Referring to FIG. 6B, since disparity vectors of a left viewpoint image 670 and a right viewpoint image 675 of a 3D image are distributed in a negative direction by N pixels, the disparity adjusting unit 140 moves both the left viewpoint image 670 and the right viewpoint image 675 in a positive direction by the N pixels so as to adjust disparity of the 3D image. Therefore, the disparity adjusting unit 140 can move the left viewpoint image 670 and the right viewpoint image 675 in the positive direction and generate a disparity adjusted left viewpoint image 680 and a disparity adjusted right viewpoint image 685, respectively.

Figure 7A:
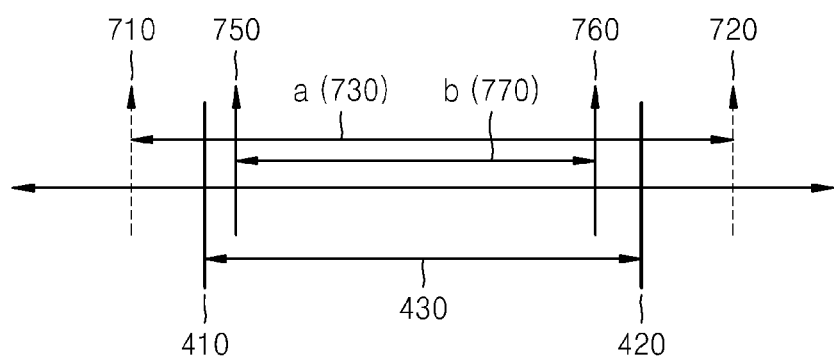
FIG. 7A illustrates an exemplary range of disparity vectors exceeding a range of disparity limit values.

FIG. 7A illustrates a range 730 of disparity vectors exceeding the range 430 of disparity limit values. Referring to FIG. 7A, the range 730 of disparity vectors exceeds the range 430 of the disparity limit values, a minimum value 710 of disparity vectors is not within the disparity minimum limit value 410 and the disparity maximum limit value 420 but a maximum value 720 of disparity vectors extends beyond the disparity minimum limit value 410 and the disparity maximum limit value 420.

In this case, a parallel movement of disparity vectors cannot allow the minimum value 710 and the maximum value 720 of disparity vectors to be within the disparity minimum limit value 410 and the disparity maximum limit value 420. The disparity adjusting unit 140 can reduce the range 730 of disparity vectors so as not to exceed the range 430 of the disparity limit values in order to adjust disparity of the 3D image.

In more detail, if the range 730 of disparity vectors and an adjusted range 770 of disparity vectors are a and b, respectively, the range 730 of disparity vectors is reduced to a:b so that the minimum value 710 and the maximum value 720 of disparity vectors can be adjusted to a minimum value 750 and a maximum value 760 of disparity vectors.

Figure 7B:
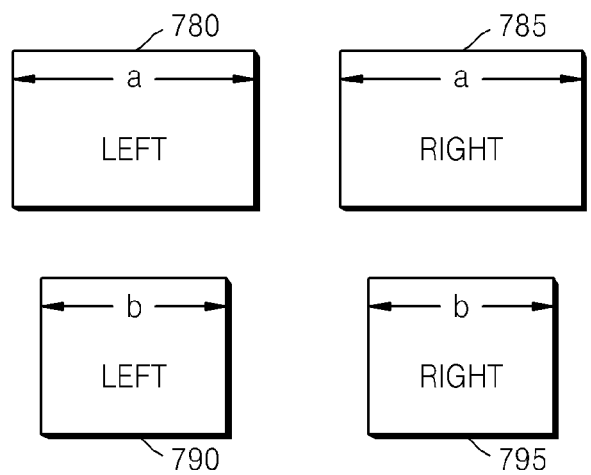
FIG. 7B is a diagram for explaining an exemplary disparity adjusting method when a range of disparity vectors exceeds a range of disparity limit values.

FIG. 7B is a diagram for explaining a disparity adjusting method when a range of disparity vectors exceeds the range of disparity limit values. Referring to FIG. 7B, since the range of disparity vectors of a left viewpoint image 780 and a right viewpoint image 785 of a 3D image exceeds the range of disparity limit values, the disparity adjusting unit 140 reduces both the left viewpoint image 780 and the right viewpoint image 785 so as to adjust disparity so that the range of disparity vectors does not exceed the range of disparity limit values. Therefore, the disparity adjusting unit 140 can reduce the left viewpoint image 780 and the right viewpoint image 785 to a:b and generate a disparity adjusted left viewpoint image 790 and a disparity adjusted right viewpoint image 795.

Figures 8, 9:
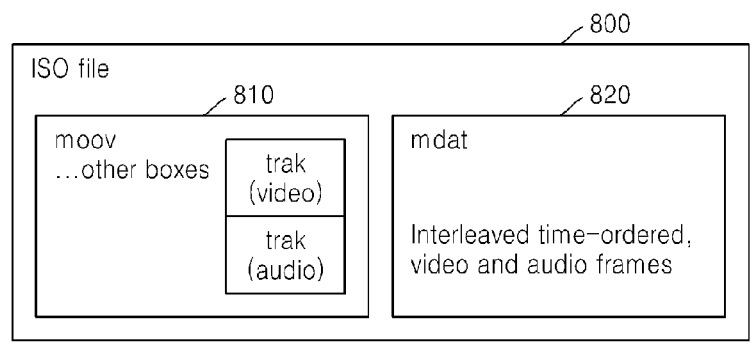
FIG. 8 is a diagram of an International Standard Organization (ISO)-based media file format.
FIG. 9 is a diagram of a box list of the ISO-based media file format according to an exemplary embodiment of the present invention.

FIG. 8 is a diagram of an ISO-based media file format. Referring to FIG. 8, an ISO file box 800 comprises a moov box 810 and an mdat box 820.

The moov box 810 includes basic header information on video traks or audio traks. The mdat box 820 includes substantial video data or audio data. Alternatively, the mdat box 820 includes interleaved time-ordered video or audio frames.

FIG. 9 is a diagram of a box list of the ISO-based media file format according to an exemplary embodiment of the present invention. Referring to FIG. 9, an ftyp box 910 indicates a file type and compatibility and includes information on a major brand of a file. In the present embodiment, the major brand of the file is set as "ssav" indicating that the file is a 3D stereo image. The "ssav" is an abbreviation of stereoscopic audio-video (AV).

A moov box 920 is a space for all pieces of metadata of timed resources. As described with reference to FIG. 8, the moov box 920 includes header information or metadata necessary for substantial media data included in an mdat box 930.

The mdat box 930 is a space for media data as described with reference to FIG. 8.

A meta box 940 is a space for metadata except for the moov box 920. A saif box 950 can be included in a lower level of another meta box that is a lower level of a trak box 970 other than the meta box 940 as a space for 3D image low-fatigue parameter information in the present embodiment.

Although not shown, the space for 3D image low-fatigue parameter information may be positioned in at least one of a lower level box of the meta box 940, a lower level box of the moov box 920, a lower level box 960 of a trak box that is a lower level box of the moov box 920, a lower level box of a trak box, and a lower level box of the meta box 940 that is the lower level box of the trak box.

Therefore, the disparity vector information obtaining unit 120 obtains disparity vector information from a low visual fatigue parameter extracted from the saif box 950.

The low visual fatigue parameter recording unit 230 records the low visual fatigue parameter in the saif box 950 of a header area of the ISO-based media file format.

FIG. 10 illustrates a structure of a 3D low visual fatigue parameter according to an embodiment of the present invention. Referring to FIG. 10, 3DParams 1010 indicates the 3D low visual fatigue parameter.

OptimalDisplayHorizontalSize (1020) indicates a horizontal size of a display screen optimized according to 3D image data.

OptimalDisplayVerticalSize (1025) indicates a vertical size of the display screen optimized according to the 3D image data.

OptimalViewDistance (1030) indicates a viewing distance optimized according to the 3D image data.

MinDisparity (1040) indicates a minimum disparity vector value of a frame section of a 3D image.

MaxDisparity (1050) indicates a maximum disparity vector value of the frame section of the 3D image.

As described with reference to FIG. 3, the disparity limit values determining unit 130 determines disparity limit values using the viewing distance and the size of the display screen that are optimized according to the 3D image, and, if the viewing distance or the size of the display screen changes, adaptively determines the disparity limit values by using trigonometry in relation to the viewing distance or the size of the display screen that is optimized according to the 3D image.

When the disparity adjusting unit 140 obtains the disparity vector information from the low visual fatigue parameter, the MinDisparity (1040) can be set as the minimum disparity vector value and the MaxDisparity (1050) can be set as the maximum disparity vector value.

FIG. 11A is a diagram for explaining a method of presenting a 3D low visual fatigue parameter in an ISO-based media file format according to an exemplary embodiment of the present invention. Referring to FIG. 11A, a low visual fatigue parameter presentation syntax corresponds to the saif box 950 (Box type: 'saif') which is necessary for a 3D multi-viewpoint camera parameter, as shown in FIG. 9. It is not mandatory (Mandatory: No) to include a low visual fatigue parameter 1110 in the ISO-based media file format. A parameter quantity is 0 or 1 (Quantity: Zero or one). The definition of each parameter is the same as described with reference to FIG. 10.

In the present embodiment, all frames of an image data stream are set as a frame section and are set to have the same low visual fatigue parameter 1110.

FIG. 11B is a diagram for explaining a method of presenting a 3D low visual fatigue parameter in an ISO-based media file format according to another embodiment of the present invention. Referring to FIG. 11B, a low visual fatigue parameter 1160 varies according over time and is set for each frame section including at least one frame.

A "for" syntax 1120 defines the low visual fatigue parameter 1160 for each frame section. In more detail, identification information 1130 (ES_ID) of a current basic stream, start frame location information 1140 (offset) in the current basic stream, and the number of frames 1150 (length) in the current basic stream are set for each frame section, so that frame information on the current basic stream and a current frame section are set and the low visual fatigue parameter 1160 is set for each frame section.

Figure 12:
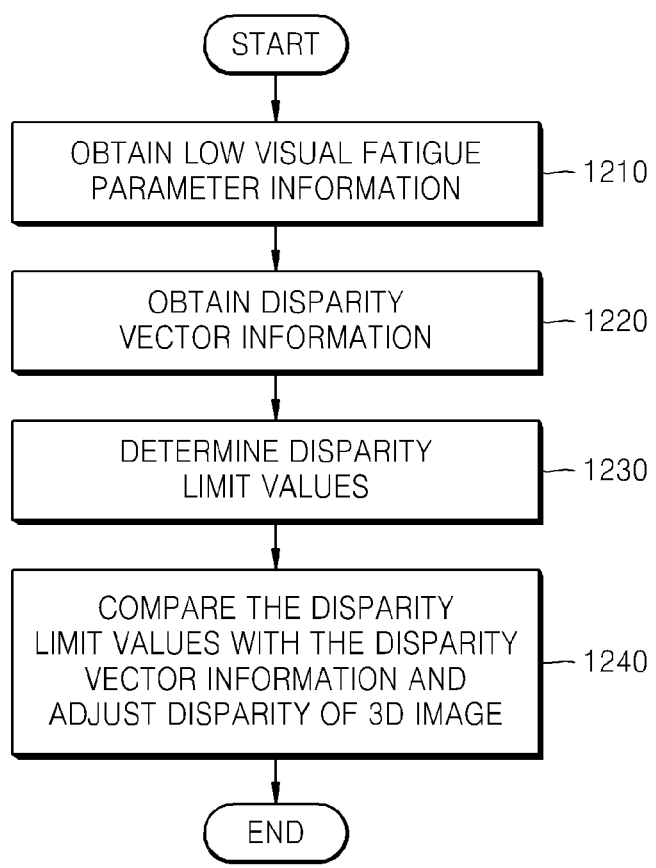
FIG. 12 is a flowchart of a method of reducing fatigue resulting from viewing a 3D image display according to an exemplary embodiment of the present invention.

FIG. 12 is a flowchart of a method of reducing fatigue resulting from viewing a 3D image display according to an exemplary embodiment of the present invention. Referring to FIG. 12, low visual fatigue parameter information with respect to a frame section including at least one frame of a received 3D image is obtained (operation 1210).

Disparity vector information with respect to each frame of the 3D image is obtained (operation 1220).

The disparity vector information may be extracted from a low visual fatigue parameter and disparity estimation is performed with respect to the 3D image so that the disparity vector information can be directly obtained.

Disparity limit values that are minimum and maximum disparity limit values of the 3D image are determined (operation 1230).

The disparity limit values are determined by using trigonometry in relation to a viewing distance, a distance between both eyes of a user, the horizontal and vertical size of the display screen, and resolution of the display screen, and the like.

The disparity limit values and the disparity vector information are compared so as to adjust disparity of the 3D image (operation 1240).

When a range size of disparity vectors is smaller than a range size of the disparity limit values and goes beyond the range size of the disparity limit values, a parallel movement of disparity vectors enables an adjustment of disparity.

According to another exemplary embodiment, when the range size of disparity vectors is greater than the range size of the disparity limit values, the 3D image is reduced so as to adjust disparity.

According to another exemplary embodiment, 3D image reproduction information including size information of a display device for a 3D image set by a service server providing the 3D image is searched for in the service server. If the size information of the display device for the 3D image set by the service server is the same as size information of a substantial 3D image display device for reproducing the 3D image, the 3D image is selected.

If the size information of the display device for the 3D image set by the service server is different from the size information of the substantial 3D image display device for reproducing the 3D image, fatigue reduction operation information indicating whether a view fatigue reduction operation can be performed is obtained from the low visual fatigue parameter information.

If it is confirmed that the view fatigue reduction operation can be performed based on the fatigue reduction operation information, an operation for determining the disparity limit values is performed. Meanwhile, if it is confirmed that the view fatigue reduction operation cannot be performed based on the fatigue reduction operation information, the display device outputs a warning message and confirms whether to reproduce the 3D image.

Figure 13:
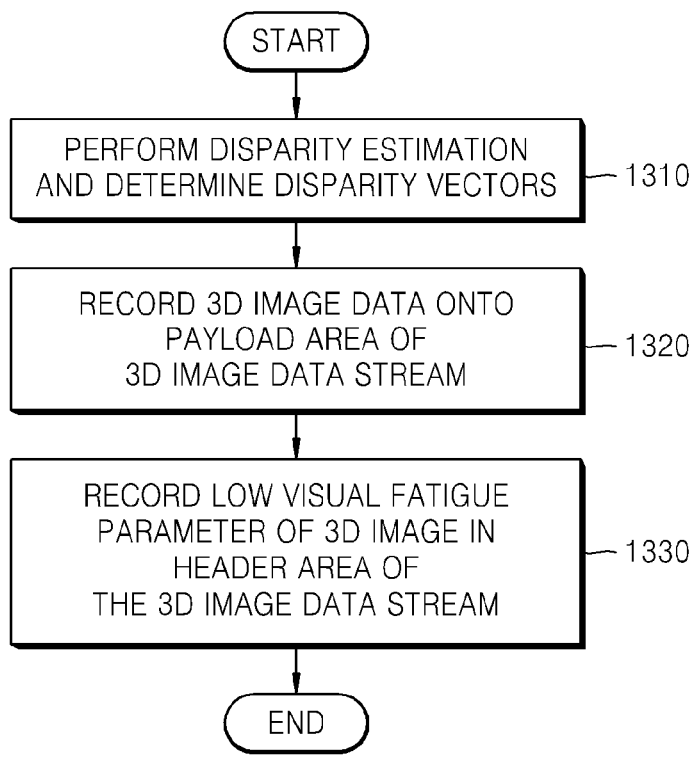
FIG. 13 is a flowchart of a method of generating a low visual fatigue 3D image data stream according to an exemplary embodiment of the present invention.

FIG. 13 is a flowchart of a method of generating a low visual fatigue 3D image data stream according to an exemplary embodiment of the present invention. Referring to FIG. 13, disparity estimation is performed with reference to frames of a 3D image and disparity vectors are determined (operation 1310).

3D image data is recorded onto a payload area of the low visual fatigue 3D image data stream (operation 1320).

A low visual fatigue parameter including at least one of the horizontal and vertical size of a display device, a viewing distance, information on the determined disparity vectors, and fatigue reduction operation information indicating whether a view fatigue reduction operation can be performed is recoded onto a header area of the low visual fatigue 3D image data stream, as a parameter of a frame section including at least one frame of the 3D image (operation 1330).

The information on the disparity vectors includes at least one of a disparity minimum value that is a minimum value of disparity vectors of all frames and a disparity maximum value that is a maximum value of disparity vectors of all frames.

Figure 14:
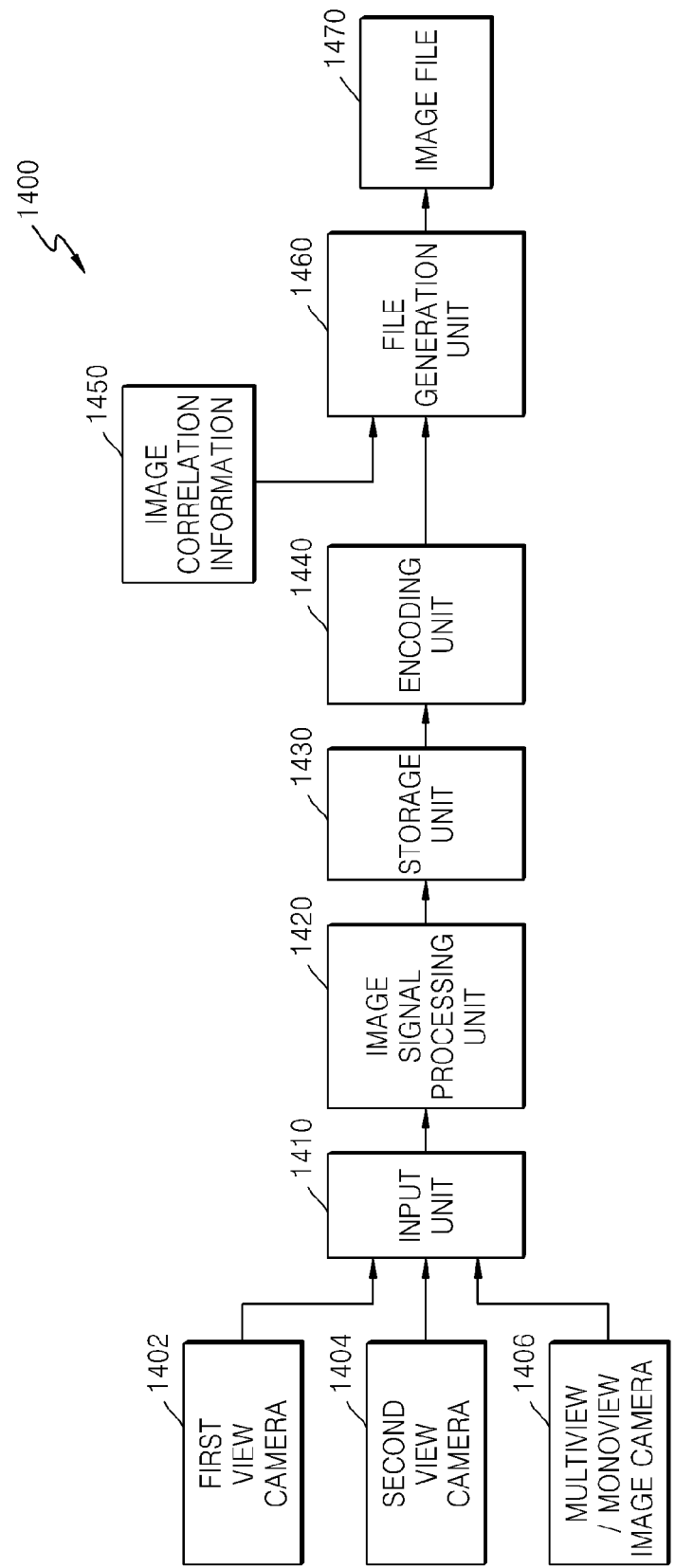
FIG. 14 is a block diagram of a stereoscopic image file generation system using a stereoscopic image datastream generation method, according to an embodiment of the present invention.

FIG. 14 is a block diagram of a stereoscopic image file generation system 1400 using a stereoscopic image datastream generation method, according to an embodiment of the present invention.

Referring to FIG. 14, the stereoscopic image file generation system 1400 includes a first view camera 1402, a second view camera 1404, a multiview/monoview image camera 1406, an input unit 1410, an image signal processing unit 1420, a storage unit 1430, an encoding unit 1440, and a file generation unit 1460.

The first and second view cameras 1402 and 1404 photograph a predetermined subject at first and second views so as to output different first and second view images, respectively. If a monoview image is also captured by the stereoscopic image file generation system 1400, a monoscopic image is output from the multiview/monoview image camera 1406. An image output from each of the first and second view cameras 1402 and 1404 and the multiview/monoview image camera 1406 is input to the input unit 1410.

The image input to the input unit 1410 is pre-processed by the image signal processing unit 1420. For example, external image values, which are analog values, are converted into digital values. Here, the external image values mean components of light and colors which are recognized by a sensor of a charge-coupled device (CCD) type or a complementary metal-oxide semiconductor (CMOS) type.

The storage unit 1430 stores image data of the pre-processed image and provides the image data to the encoding unit 1440. Although the storage unit 1430 is separately illustrated, the stereoscopic image file generation system 1400 may further include other storage elements for buffering between the other elements of the stereoscopic image file generation system 1400, which are not the storage unit 1430.

The encoding unit 1440 encodes the image data received from the storage unit 1430. If necessary, the encoding of the image data by the encoding unit 1440 may be omitted.

The file generation unit 1460 inserts image correlation information 1450 and the (encoded) image data received from the encoding unit 1440, into a predetermined file format so as to generate an image file 1470. The image correlation information 1450 may include reference information of a track box for representing correlations between images, and handler information for representing a media type of each image.

Also, the image correlation information 1450 may include two-dimensional (2D) image-related information and three-dimensional (3D) image-related information. The 3D image-related information represents a correlation between the first and second view images, and may include information on 2D/3D data sections, information on an arrangement method of the first and second view images, information on an image file type, a camera parameter, display information, and information on a disparity.

According to an embodiment of the present invention, the file generation unit 1460 may store the image data and the image correlation information 1450 respectively in a media data region and a header region of the image file 1470. If the image file 1470 is an ISO-based media file format, the image data may be stored in the form of an elementary stream, in an mdat box, and the image correlation information 1450 may be stored in a trak box or any sub-level box of the trak box.

The image file 1470 is input or transmitted to a 3D image file reproduction apparatus.

Figure 15:
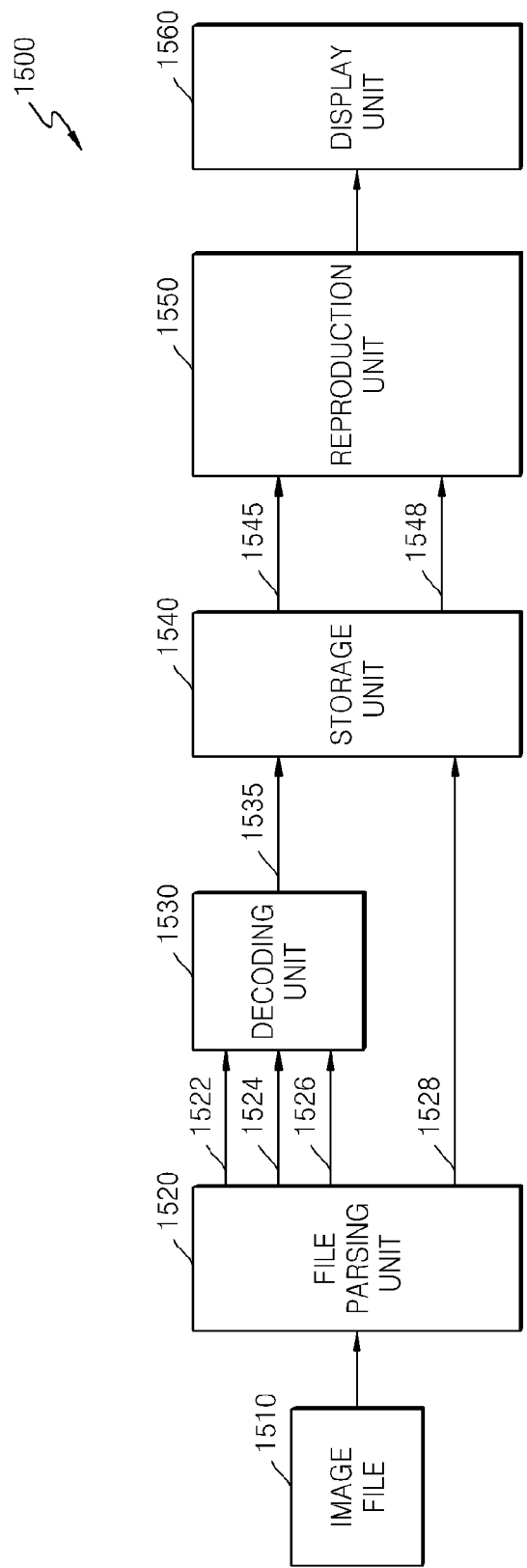
FIG. 15 is a block diagram of a stereoscopic image restoration/reproduction system using a stereoscopic image restoration method, according to an embodiment of the present invention.

FIG. 15 is a block diagram of a stereoscopic image restoration/reproduction system 1500 using a stereoscopic image restoration method, according to an embodiment of the present invention.

Referring to FIG. 15, the stereoscopic image restoration/reproduction system 1500 includes a file parsing unit 1520, a decoding unit 1530, a storage unit 1540, a reproduction unit 1550, and a display unit 1560.

The file parsing unit 1520 parses a received image file 1510. After information stored in each of a ftyp box, a moov box, a trak box, and a meta box is analyzed, image data stored in an mdat box may be extracted. First view image data 1522, second view image data 1524, and multiview/monoview image data 1526 may be extracted as the image data. By parsing the image file 1510, image data-related information 1528 may also be extracted. The image data-related information 1528 may include correlation information between images, such as trak reference information regarding related tracks.

The decoding unit 1530 receives and decodes the image data including the first view image data 1522, the second view image data 1524, and the multiview/monoview image data 1526 which are extracted from the image file 1510. The decoding is performed only if the image data in the image file 1510 has been encoded. The storage unit 1540 receives and stores (decoded) image data 1535 that is output from the decoding unit 1530, and the extracted image data-related information 1528 that is extracted by the file parsing unit 1520.

The reproduction unit 1550 receives image reproduction-related information 1548 and image data 1545 to be reproduced, from the storage unit 1540 so as to reproduce an image. The image reproduction-related information 1548 is information required to reproduce the image from among the image data-related information 1528, and includes image correlation information.

The reproduction unit 1550 may reproduce the image data 1545 in a 2D or 3D image reproduction method, by using the image reproduction-related information 1548. For example, the reproduction unit 1550 may combine and reproduce correlated stereoscopic images by referring to image data identification information. Also, the reproduction unit 1550 may reproduce the correlated stereoscopic images and a monoscopic image together, by referring to the image data identification information and 2D/3D data section information.

The display unit 1560 may display the image reproduced by the reproduction unit 1550, on a screen. The display unit 1560 may be a barrier liquid crystal display (LCD). A monoscopic image may be displayed when the barrier LCD is turned off, and each view image of a stereoscopic image may be displayed when the barrier LCD is turned on.

The present invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and the like, as would be understood by one of skill in the art.

Methods and apparatuses for reducing fatigue resulting from viewing a 3D image display according to exemplary embodiments of the present invention measure disparity limit values that cause a user to experience fatigue from viewing the 3D image display according to a viewing distance, a distance between both eyes of the user, the size and resolution of a display device, and adjust a disparity so that a disparity vector range of a 3D image does not exceed the disparity limit values, thereby reducing the fatigue.

Furthermore, exemplary embodiments of the present invention can elaborately present low visual fatigue parameter information on each 3D image through a time-based low visual fatigue parameter per frame section unit.

Furthermore, exemplary methods and apparatuses for generating a data stream of a low visual fatigue 3D image according to embodiments of the present invention include low visual fatigue parameter information for reducing fatigue resulting from viewing a 3D image display on a header area of the 3D image data stream, thereby reducing the fatigue in an efficient manner. Hence, it is possible to view the 3D image for a long period of time.

While the present invention has been particularly shown and described with reference to exemplary embodiments thereof, it will be understood by those of ordinary skill in the art that various changes in form and details may be made therein without departing from the spirit and scope of the present invention as defined by the following claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of reconstructing a stereoscopic image from an image data stream in which stereoscopic image data is inserted, the method comprising:

parsing the stereoscopic image data stream in an International Standard Organization (ISO)-based media file format, the ISO-based media file format comprising a moov box, an mdat box, and a meta box;

obtaining, from a first box in the meta box of the stereoscopic image data stream, low visual fatigue parameter information with respect to a frame section comprising at least one frame of a received stereoscopic image from the stereoscopic image data stream;

extracting at least one of horizontal size information and vertical size information of the display device predetermined with respect to the stereoscopic image from the low visual fatigue parameter information;

extracting viewing distance information predetermined with respect to the stereoscopic image from the low visual fatigue parameter information; and reconstructing the stereoscopic image using the stereoscopic image data extracted from the mdat box of the image data stream;

wherein the low fatigue parameter is used for displaying the reconstructed stereoscopic image in a three dimensional display mode, and wherein the viewing distance information indicates a distance between the display device and a viewer.

2. The method of claim 1, further comprising displaying the reconstructed stereoscopic image in the three dimensional display mode using the at least one of horizontal size information and vertical size information of the display device and the viewing distance information.

3. A method of reconstructing a stereoscopic image from an image data stream in which stereoscopic image data is inserted, the method comprising:

parsing the stereoscopic image data stream in an International Standard Organization (ISO)-based media file format, the ISO-based media file format comprising a moov box, an mdat box, and a meta box;

obtaining, from a first box in the meta box of the stereoscopic image data stream, low visual fatigue parameter information with respect to a frame section comprising at least one frame of a received stereoscopic image from the stereoscopic image data stream;

extracting at least one of horizontal size information and vertical size information of the display device predetermined with respect to the stereoscopic image from the low visual fatigue parameter information;

extracting viewing distance information predetermined with respect to the stereoscopic image from the low visual fatigue parameter information;

extracting disparity vector information with respect to disparity vectors of each frame of the stereoscopic image; and reconstructing the stereoscopic image using the stereoscopic image data extracted from the mdat box of the image data stream;

wherein the low fatigue parameter is used for displaying the reconstructed stereoscopic image in a three dimensional display mode, and wherein the viewing distance information indicates a distance between the display device and a viewer.

4. The method of claim 3, further comprising displaying the reconstructed stereoscopic image in the three dimensional display mode using the at least one of horizontal size information and vertical size information of the display device, the viewing distance information and the disparity vector information.

5. The method of claim 3, wherein the disparity vector information comprises at least one of minimum value information and maximum value information among values of disparity vectors between left-view right-view images.

6. The method of claim 3, wherein the disparity vectors comprise at least one of a global disparity vector, a representative disparity vector, a foreground disparity vector and a background disparity vector between left-view and right-view images.

7. A method of generating a stereoscopic image data stream in an ISO-based media file format, the ISO-based media file format comprising a moov box, an mdat box, and a meta box, the method comprising:

inserting low visual fatigue parameter information with respect to a frame section comprising at least one frame of stereoscopic images into a first box in the meta box of the stereoscopic image data stream; and inserting the stereoscopic image data of the stereoscopic images into the mdat box of the stereoscopic image data stream, wherein the low visual fatigue parameter comprises at least one of a horizontal and vertical size of a display device and a viewing distance predetermined with respect to the stereoscopic image and is used for displaying the reconstructed stereoscopic image in a three dimensional display mode, and wherein the viewing distance information indicates a distance between the display device and a viewer.

8. A method of generating a stereoscopic image data stream in an ISO-based media file format, the ISO-based media file format comprising a moov box, an mdat box, and a meta box, the method comprising:

inserting low visual fatigue parameter information with respect to a frame section comprising at least one frame of stereoscopic images into a first box in the meta box of the stereoscopic image data stream; and inserting the stereoscopic image data of the stereoscopic images into the mdat box of the stereoscopic image data stream, wherein the low visual fatigue parameter comprises at least one of a horizontal and vertical size of a display device and a viewing distance predetermined with respect to the stereoscopic image and is used for displaying the reconstructed stereoscopic image in a three dimensional display mode, and wherein the viewing distance information indicates a distance between the display device and a viewer.

9. The method of claim 8, wherein the disparity vector information comprises at least one of minimum value information and maximum value information among values of disparity vectors between left-view right-view images.

10. The method of claim 8, wherein the disparity vectors comprise at least one of a global disparity vector, a representative disparity vector, a foreground disparity vector and a background disparity vector between left-view and right-view images.

\* \* \* \* \*